(12) United States Patent
Dam

(10) Patent No.: US 8,576,479 B2
(45) Date of Patent: Nov. 5, 2013

(54) UP-CONVERSION OF ELECTROMAGNETIC RADIATION WITHIN A WAVELENGTH RANGE

(75) Inventor: Jeppe Seidelin Dam, Kgs. Lyngby (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 13/643,534

(22) PCT Filed: May 3, 2011

(86) PCT No.: PCT/DK2011/050151
§ 371 (c)(1),
(2), (4) Date: Nov. 28, 2012

(87) PCT Pub. No.: WO2011/137907
PCT Pub. Date: Nov. 10, 2011

(65) Prior Publication Data
US 2013/0063807 A1    Mar. 14, 2013

Related U.S. Application Data

(60) Provisional application No. 61/331,030, filed on May 4, 2010.

(30) Foreign Application Priority Data

May 4, 2010 (EP) .................................... 10161864

(51) Int. Cl.
*G02F 1/35* (2006.01)
(52) U.S. Cl.
USPC ............................................ 359/326; 372/22
(58) Field of Classification Search
USPC ................................ 359/326, 328; 372/21–22
See application file for complete search history.

(56) References Cited

U.S. PATENT DOCUMENTS 5,450,463 A    9/1995    Iketaki
(Continued)

FOREIGN PATENT DOCUMENTS

EP          0 725 307 A2    8/1996
WO     WO 2010/006985 A2   1/2010

OTHER PUBLICATIONS

Midwinter, J.E. "B-3—Parametric Infrared Image Converters" IEEE Journal of Quantum Electronics, Nov. 1968, pp. 716-720, vol. QE-4, No. 11.

*Primary Examiner* — Daniel Petkovsek
(74) *Attorney, Agent, or Firm* — Knobbe Martens Olson & Bear LLP

(57) ABSTRACT

Prior art techniques for converting the wavelength of electromagnetic radiation by non-linear interactions such as sum frequency generation SFG produces blurred images when applied to polychromatic images. The invention provides an improved arrangement (15) for up-converting incoming electromagnetic radiation with dissimilar first wavelengths ($\lambda$,) distributed in a first wavelength interval ($\Delta\lambda$,) into up-converted electromagnetic radiation comprising corresponding dissimilar up-converted wavelengths ($\lambda_3$), smaller than the first wavelengths ($\Delta_1$). The arrangement applies a nonlinear crystal (5) and a laser (16) for providing a laser beam (10) of second wavelength, different from the first wavelengths ($\lambda_1$) inside the nonlinear crystal, and a Fresnel zone plate (17) for focusing or converging the incoming radiation inside the nonlinear crystal in spatial overlap with the laser beam. The up-converted radiation is produced inside the non-linear crystal by sum frequency generation between the incoming radiation and the laser beam. The arrangement (15) can comprise an image forming lens arrangement (20) for forming an object image (2), a second zone plate (18) for forming an up-converted image (3) and an image sensor (19) on which the up-converted image (3) is formed.

15 Claims, 4 Drawing Sheets

(56) References Cited

U.S. PATENT DOCUMENTS

| | | |
|---|---|---|
| 5,627,679 A | 5/1997 | Iba |
| 5,963,359 A | 10/1999 | Shinozaki et al. |
| 6,930,821 B2 * | 8/2005 | Kurz et al. ............... 359/328 |
| 6,947,453 B2 * | 9/2005 | Sidorin ............... 372/20 |
| 7,560,707 B2 * | 7/2009 | Bratkovski ............... 250/458.1 |
| 2003/0133478 A1 | 7/2003 | Sidorin |
| 2004/0227986 A1 | 11/2004 | Kurz et al. |

* cited by examiner

UP-CONVERSION OF ELECTROMAGNETIC RADIATION WITHIN A WAVELENGTH RANGE

CROSS REFERENCE TO RELATED APPLICATIONS

This application claims is a U.S. National Phase Application of PCT International Application Number PCT/DK2011/050151, filed on May 3, 2011, designating the United States of America and published in the English language, which is an International Application of and claims the benefit of priority to U.S. Provisional Application No. 61/331,030, filed on May 4, 2010, and European Patent Application No. 10161864.3, filed on May 4, 2010. The disclosures of the above-referenced applications are hereby expressly incorporated by reference in their entireties.

FIELD OF THE INVENTION

The present invention relates to up-conversion of light to shorter wavelengths (or higher frequencies), in particular, the invention relates to up-conversion of a two-dimensional image consisting of light with several different wavelengths (or colors, if visible).

BACKGROUND OF THE INVENTION

Conversion of wavelengths from one part of the electromagnetic spectrum to another part of the spectrum typically involves a system using a nonlinear crystal and the mechanism of sum-frequency-generation (SFG). The SFG occurs in the interaction between an incoming laser beam to be wavelength converted and an intensive laser beam, resulting in an output laser beam having a wavelength corresponding to the sum of the frequencies of the interacting laser beams. Thereby, the wavelength of one of the incoming laser has been up-converted to a higher frequency/shorter wavelength.

Examples of such systems are described in WO 2010/006985 or in EP 0 725 307.

SUMMARY OF THE INVENTION

As will be described in more detail later in relation to FIG. 1, the in-coming EM radiation is typically magnified by the prior art optical arrangements used in wavelength conversion. The inventor has found the problem and the disadvantage that part of this magnification varies with the wavelength of the incoming radiation. The inventor has further realized that when the incoming radiation is an image (and not just a narrow beam) containing several dissimilar wavelengths (and not just monochromatic laser radiation), the result of this wavelength dependent magnification is that the sharpness of the up-converted image will decrease (or the blurriness will increase) when moving away from the optical axis, leading to un-sharp or blurry images.

It is thus a problem of the prior art that wavelength conversion by sum-frequency-generation results in a wavelength-dependent magnification or miniaturization of the up-converted beam.

This, however, has not been realized as a problem of the prior art. The prior art describing the optical arrangements used in SFG wavelength conversion only relates to incoming radiation from monochromatic light sources, namely lasers. In addition, even when up-converting lasers that are not strictly monochromatic (such as femtosecond lasers), the laser beams have regular profiles without any image content such that the wavelength-dependent magnification does not result in any noticeable distortion in the up-converted beam profile. Hence, the above problem and disadvantage is not posed or obvious from the prior art.

The present invention solves this problem by applying zone plates for focusing or converging the incoming radiation inside the non-linear crystal.

It is an object of the invention to provide a method and an arrangement, as well as use of such, for up-converting incoming EM radiation to achieve an improved quality of up-converted images in relation to the prior art.

It is another object of the invention to provide a method and an arrangement, as well as use of such, for up-converting incoming EM radiation with reduced or eliminated wavelength dependency on the magnification or miniaturization in wavelength conversion by sum-frequency-generation.

In a first aspect, the invention provides an arrangement for up-converting incoming polychromatic electromagnetic radiation (EMR) in wavelength interval $\Delta\lambda_1$ into up-converted EMR in corresponding wavelength interval $\Delta\lambda_3$ of smaller wavelengths than the wavelength interval $\Delta\lambda_1$, the arrangement comprising:
  a nonlinear crystal;
  a laser for providing a laser beam having a second wavelength, $\lambda_2$, different from the first wavelengths;
  a focusing arrangement comprising a first zone plate for converging the incoming EMR inside the nonlinear crystal;
wherein the nonlinear crystal is selected for producing up-converted EMR by sum frequency generation between the incoming EMR and the laser beam; and
wherein the arrangement is configured so that:
  the laser beam will be provided in the nonlinear crystal; and
  the focusing arrangement will converge the incoming EMR in the nonlinear crystal in spatial overlap with the laser beam.

In a second aspect, the invention provides a corresponding method for up-converting incoming polychromatic electromagnetic radiation (EMR) into up-converted EMR with wavelength smaller than the incoming EMR, the method comprising:
  converging incoming polychromatic EMR in a nonlinear crystal by means of a focusing arrangement comprising a first zone plate;
  providing a laser beam of a second wavelength, $\lambda_2$, in the nonlinear crystal;
  producing up-converted EMR by sum frequency generation between the incoming EMR and the laser beam in a spatial overlap between these inside the non-linear crystal.

Additionally, it is preferred that the laser beam is not focused in the nonlinear crystal by the first zone plate of the focusing arrangement. In an alternative formulation, it is only the incoming EMR that is converged or focused in the non-linear crystal by the first zone plate.

It is also preferred that the zone plate has a phase distribution function equivalent to a spherical convex lens. Thereby, the incoming EMR is focused to form an at least substantially planar wavefront inside the nonlinear crystal.

Zone plates have wavelength dependent focal lengths which can be expressed as $f=k/\lambda$, where k is a constant from the zone plate design and $\lambda$ the wavelength of the light. The basic idea of the invention is that by converging (or focusing) the incoming EMR with a zone plate, the wavelength dependent focal length of the zone plate can be used to compensate the wavelength dependent magnification occurring in the SFG. This will be described in further detail later.

In the following, a number of preferred and/or optional features, elements, examples and implementations will be summarized. Features or elements described in relation to one embodiment or aspect may be combined with or applied to the other embodiments or aspects where applicable. For example, structural and functional features applied in relation to the method may also be used as features in relation to the DEVICE and vice versa. Also, explanations of underlying mechanisms of the invention as realized by the inventors are presented for explanatory purposes, and should not be used in ex post facto analysis for deducing the invention.

The present invention is preferably used to up-convert polychromatic EMR containing image information which is different from a beam profile of the laser beam applied in the SFG. Thus, it is preferred that the incoming EMR is not a laser beam. Alternatively or additionally, it may be preferred that the incoming EMR predominantly consists of natural light originating from black body or heat radiation and/or radiation from the Sun.

Herein, the incoming EM radiation is also referred to as simply the incoming radiation or light (without implying visible radiation). The incoming radiation can be spatially coherent or incoherent. In a preferred embodiment, the method according to the invention is applied to spatially incoherent incoming radiation. This is advantageous as reflected light from objects is typically spatially incoherent in most naturally occurring situation such as outside an optical laboratory.

In the present description and claims, the term "converging" is used as meaning focusing, converging or infinity correcting (i.e. focusing an infinity, corresponding to generation of a plane wave or an approximately plane wave). The reason for this notation is that the focusing using a zone plate relies on diffraction, and the "focusing effect" of a zone plate is therefore proportional with a degree of spatial coherence of the incoming light. For spatially incoherent light, the zone plate will still result in some diffraction, but to a lesser degree. Hence, it is more proper to refer to the focusing of the zone plate using the term converging, intended to cover the "focusing effect" of the zone plate regardless of the degree of spatial coherence of the incoming radiation. In order to apply standard optical terminology, the term focusing will sometimes also be used in relation to zone plates without this implying any degree of spatial coherence of the radiation, e.g. in the term focusing arrangement.

The incoming EM radiation is preferably polychromatic or non-monochromatic (equivalent term), meaning that the dissimilar first wavelengths of the incoming EM radiation are preferably distributed continuously and/or discontinuously in a first wavelength interval, $\Delta\lambda_1$. The first wavelength interval is thereby defined as the wavelength range or interval between the largest and smallest of the first wavelengths. Correspondingly, the up-converted EMR and the produced dissimilar up-converted wavelengths, $\lambda_3$, are distributed continuously and/or discontinuously in an up-converted wavelength interval, $\Delta\lambda_3$. These embodiments are desirable as a problem solved by the present invention, un-sharpness or blurriness in up-converted images, is not present for monochromatic incoming radiation. In addition, it may therefore be preferred that the interval $\Delta\lambda_1$ is of a certain size, as the un-sharpness or blurriness in up-converted images produced by prior art systems increases with bandwidth. It may thus be preferred that $\Delta\lambda_1$ is equal to or larger than $\lambda_1/200$, such as equal to or larger than $\lambda_1/100$, or preferably equal to or larger than $\lambda_1/50$, $\lambda_1/20$, or $\lambda_1/10$.

The incoming radiation preferably comprises a plurality of spatial frequencies so that it contains image information such as information related to a scene, a view, an picture, graphics, text, patterning etc., which is different from a beam profile typical for a collimated beam of light such as a laser beam. Preferably, the incoming EMR forms a one- or two-dimensional image with an image plane having a spatial extension transverse to the direction to the zone plate. Therefore, in preferred embodiments, the method and the arrangement serves to up-convert a one- or two-dimensional image comprising represented in the incoming radiation. Alternatively or additionally, the method according to the first aspect may further comprise producing a two-dimensional image from the incoming radiation before conversion by the first zone plate. In a similar embodiment, the arrangement may comprise imaging optics arranged before the first zone plate for producing a two-dimensional image from the incoming EMR. These embodiments are preferred as incoming radiation being a point source (0-dimensional) such as a collimated laser beam will not lead to the problems of un-sharp or blurred up-converted images that the present invention is aimed at solving.

The image may be formed by EMR from any one, two or three-dimensional object which may be illuminated by a radiation source or be a radiation source itself. In addition, the incoming radiation may comprise any one of coherent radiation, incoherent radiation and a combination of coherent and incoherent radiation.

In a further embodiment, at least some of the incoming polychromatic EMR (i.e. the dissimilar first wavelengths) has a wavelength longer than 400 nm, such as longer than 750 nm, such as involving one or more of infrared radiation (IR), terahertz (THz) radiation, or microwave (MW) radiation. This is advantageous as most commercial applications of the present invention relate to up-conversion of radiation in these spectra to shorter wavelengths/higher frequencies where commercial image sensors work. The effect limiting the maximum wavelength is the fact that long wavelengths have virtually no momentum, and thus do not significantly influence the direction of the up-converted light when added to the momentum of the laser beam photons—thereby the image information is "over-shadowed" by the laser beam and thus destroyed in the up-converted image. The obtainable resolution presented geometry presented herein is inversely proportional to $\lambda_1$. It may therefore also be preferred that the first wavelengths are shorter than 30 µm. This is advantageous for ensuring an up-converted image with a resolution applicable in commercial applications.

It is to be preferred that the produced up-converted EMR is also focused or collimated by means of a zone plate. Thus, in a preferred embodiment, the arrangement further comprises a second zone plate for receiving the up-converted EMR from the non-linear crystal.

A zone plate, sometimes also referred to as a Fresnel zone plate, is device capable of converging or focusing radiation by diffracting light from annular "zones" or "phases" which then interfere constructively in a focal point. Light from zones which would interfere destructively are either blocked with an opaque material or subject to a phase shift resulting in a constructive contribution in the interference at the focal point. A zone plate may appear as a plate or screen with either alternating opaque and transparent concentric rings (the opacity may vary gradually) or concentric rings of varying material thickness and/or refractive index.

The configuration or design of a zone plate refers, among other things, to the distribution of the zones, the so-called phase distribution function, describing e.g. the positions (radii) and sizes of the zones and the transition from one material thickness and/or refractive index to another (or from opaque to transparent). These radii depend on the wavelength of the light that the zone plate is meant to focus, the desired distance from the center of the zone plate to the focus (the focal length) as well as the type of lens the zone plate is supposed to emulate. Hence, zone plates are typically configured to work optimally for a selected wavelength, and will work less optimally the further away from this wavelength the light is. In a preferred embodiment, a configuration of the first zone plate is optimized for a wavelength in the first wavelength interval, $\Delta\lambda_1$. Similarly, a configuration of a second zone plate may be optimized for a wavelength in the third wavelength interval, $\Delta\lambda_3$. The zone plates are preferably also formed by materials with high transmission at the relevant selected wavelength.

In order to have a uniform SFG, it is preferred that the converged or focused incoming EMR forms a plane or approximately plane wave inside the non-linear crystal. To form such plane wave, it is preferred that the zone plate has a phase distribution function equivalent to a spherical convex lens. Thus, in a preferred embodiment, the first zone plate has a phase distribution function at least substantially corresponding to a convex lens. This phase distribution can be in 2 levels (binary zone plate, M=2), multiple levels (M), or a piecewise continuous function (M→Infinity). M is the number of levels, and thereby also the number of zones used to run through one complete series of levels, e.g. in binary zone plates (M=2, see e.g. FIG. 3A) a complete series of levels would consist of one zone with zero phase shift and one zone with n phase shift a different radii, in a three-level zone plate (M=3, see e.g. FIG. 3B) a complete series of levels would consist of three zones with phase shift 0, 2n/3, and 4n/3, respectively, at different radii. The zone plate will then contain n/M complete series of levels.

To a phase distribution function at least substantially corresponding to a convex lens, the zone plate should shift the phase modulation level, i.e. shift zone, according to $$r_n = \sqrt{\frac{2nf\lambda}{M}}.$$

A binary zone plate thus shifts from 0 phase modulation to 180° phase modulation at the radii given by the equation: $r_n = \sqrt{nf\lambda} = \sqrt{nk}$, where n is the number of zones. A multilevel phase plate shifts from 0° to 360°/M, to 2*360°/M, . . . to M−1 360°/M at radii $$r_n = \sqrt{\frac{2nf\lambda}{M}}.$$

The use of such zone plate equivalent to a spherical convex lens provides the advantage of focusing the incoming EMR to a plane or approximately plane wave inside the non-linear crystal, thereby ensuring a uniform SFG which serves to conserve the spatial intensity distribution over the image of the incoming EMR.

On a side note, a Fresnel zone plate equivalent to an axicon lens as disclosed in EP 0 725 307 is generally defined by its cone angle, but has a focal length given by $f=R/\lambda$, where R is the distance from the center of the axicon. Thus, while providing a wavelength dependency similar to the zone plate equivalent to a spherical convex lens, it will not focus the incoming EMR to a plane or approximately plane wave inside the non-linear crystal, resulting in loss of image information.

Whether the incoming light is spatially coherent or not, the best resolution is obtained by having large transverse dimensions of the laser beam ($\lambda_2$) inside the non-linear crystal. In the case of spatially coherent incoming radiation, all spatial frequencies can be fitted inside the crystal by proper focusing by the first zone plate. In the case of spatially incoherent incoming radiation, it may not be possible to converge all radiation inside the non-linear crystal, and the laser mode preferably forms an aperture (inside the non-linear crystal) that is large enough to support high resolution imaging.

The arrangement is preferably configured such that the interaction between the incoming radiation and the laser beam inside the non-linear crystal comprises sum frequency generation, SFG. SFG constitute the underlying physical mechanism that allows for up-converting of incoming radiation as described herein. That is, the shortest wavelength of the up-converted wavelength interval may be shorter than the shortest wavelength of the first wavelength interval. For example, the first wavelength interval may be an infrared wavelength interval and the up-converted wavelength interval may be a visible wavelength interval, or the first wavelength interval may be a mid-infrared wavelength interval and the up-converted wavelength interval may be a near infrared wavelength interval.

The material of the non-linear crystal may be selected to optimize the SFG between incoming radiation in the first wavelength interval and a laser with the second wavelength.

The non-linear crystal may be phase matched to optimize the conversion of incoming radiation in the first wavelength interval to the radiation in the up-converted or third wavelength interval. In order to obtain a good interaction between the incoming radiation and the laser beam to the up-converted radiation, phase matching (PM) or quasi phase matching (QPM) is required. The nonlinear crystal may be configured to be tuned for obtaining phase matching. This can be accomplished using angle tuning of the nonlinear crystal, by applying temperature or pressure to crystal or through quasi phase matching.

The nonlinear crystal may be configured to be poled for obtaining phase matching. This is method is referred to as quasi phase matching. By (synthetically) changing the direction of the polarization of the dipole moment of the nonlinear crystal periodically, quasi phase matching can be obtained. The periodicity is specific to the interaction at hand. Two nonlinear crystals often used for quasi phase matching are KTP and $LiNbO_3$.

The nonlinear crystal may be configured to be poled in a fanned manner. The fanning implies that the periodicity of the poled crystal is different at different transverse positions in the crystal. Thus by translating the nonlinear crystal transversely with respect to the incoming radiation, different wavelength components of the incoming radiation can be quasi phase matched, thus efficiently processed.

The nonlinear crystal may be a Brewster cut. This is advantageous since it solves a practical problem that arises from the fact that three different wavelengths are involved, i.e. the wavelength of the incoming radiation, the wavelength of the laser beam and the wavelength of the up-converted radiation. It is difficult and expensive to manufacture dielectric coatings that can act as an antireflection coating at all three wavelengths. However if the nonlinear crystal is Brewster cut, p-polarized will essentially be transmitted loss-less (or with very low loss), thereby elevating the need for coatings at the end surfaces. When using quasi phase matching all the three mentioned radiation fields can be p-polarized. Thus periodically poled crystals with Brewster cut ends are particularly advantageous.

The laser may be provided by many different types of lasers or laser systems, including lasers involving a laser pumped by another laser, laser arrays, resonators and more, some of which will be described elsewhere. Optical components such as lenses and mirrors for directing the laser beam to, and optionally focusing it in, the non-linear crystal may be provided in association with the laser.

Lasers are generally available within a large range of wavelengths. The second wavelength, $\lambda_2$, of the laser beam is selected depending on the wavelength of the incoming radiation, $\lambda_1$, and the desired wavelength of the up-converted radiation, $\lambda_3$, where the relation is given by:

$$\lambda_3 = \left(\frac{1}{\lambda_1} + \frac{1}{\lambda_2}\right)^{-1}.$$

It is preferable that the laser provides a second wavelength in the NIR or visible spectrum. This is advantageous as most commercial applications involves converting longer wavelengths to shorter wavelengths/higher frequencies in or near the near infrared (NIR) and visible spectra.

It is a preferable feature that the laser beam has a high power inside the non-linear crystal. This is advantageous as the efficiency of the SFG and thereby the power of the up-converted radiation increases with increasing power of the incoming radiation and the laser. However, most often the incoming radiation is determined by the nature of the application and difficult to amplify. Thus, it is preferred that the power of the laser beam inside the non-linear crystal is at least 10 W, such as at least 25 W, 50 W, 75 W, or preferably at least 100 W. The maximum power is limited by the damage intensity threshold and size of the non-linear crystal. Different kinds of lasers are capable of delivering such high powers include diode lasers, $CO_2$ lasers, solid state lasers, fiber lasers, disc lasers etc.

In a preferred embodiment, the laser beam is collimated or at least substantially collimated inside the non-linear crystal. How this may be achieved depends on the relation between the focusing of the beam and the non-linear crystal. In case of long crystals, it may be achieved by a beam which is not very tightly focused, so that the Raleigh length is long relative to the length of the beam inside the crystal. On the other extreme with a short crystal, the beam may be tightly focused as only the focus point itself (where the wavefront is always planar) is inside the crystal. It may also be preferred to keep the laser beam inside the non-linear crystal as large as possible in relation to the size of the non-linear crystal. The different embodiments above may be quantified by relations between the crystal's width ($D_x$) and height ($D_y$) in directions transverse to the propagation of the laser beam and the corresponding largest and smallest diameters of the laser beam during its propagation through the non-linear crystal, $d_{x\_max}$; $d_{y\_max}$ and $d_{x\_min}$; $d_{y\_min}$, respectively. Now, $d_{x\_min}$ and $d_{y\_min}$ are typically the diameters at the laser beam waist (or focus) inside the non-linear crystal, and $d_{x\_max}$ and $d_{y\_max}$ are typically the laser beam diameters at the front and/or back facet of the non-linear crystal. It may generally be preferred to keep the beam waist(s) $d_{x\_min}$ and $d_{y\_min}$ as large as possible to obtain a plane wavefront through the non-linear crystal. But, when designing the arrangement, this parameter can typically not be optimized alone without regard to the largest beam diameter inside the crystal and the dimensions of the crystal. It may then be preferred that $d_{x\_max} > 0.95 D_x$, such as $> 0.9 D_x$ or $> 0.8 D_x$. It may also be preferred that $d_{y\_max} > 0.95 D_y$, such as $> 0.9 D_y$ or $> 0.8 D_y$. Similarly, it may then be preferred that $d_{x\_min} > 0.95 D_x$, such as $> 0.9 D_x$ or $> 0.8 D_x$. It may also be preferred that $d_{y\_min} > 0.95 D_y$, such as $> 0.9 D_y$ or $> 0.8 D_y$. It may also be relevant to look only at the largest and smallest diameters of the laser beam inside the crystal, so that the focusing of the beam inside the crystal may be adjusted ratio so that $d_{x\_min}/d_{x\_max} > 0.98$, such as $> 0.95$, $> 0.9$ or $> 0.8$, and/or similarly so that $d_{y\_min}/d_{y\_max} > 0.98$, such as $> 0.95$, $> 0.9$ or $> 0.8$. These embodiments are advantageous for obtaining a good resolution in the up-converted image. To obtain a good resolution in the up-converted image, it is of interest that the laser beam has a plane wave front inside the non-linear crystal, rather than a tightly focused beam. To understand why, the SFG can be described as adding the momentum vectors of the photons in the incoming radiation and the laser beam. An up-converted radiation photon's momentum vector will have a length corresponding to the up-converted wavelength, i.e. addition of the frequencies of the incoming radiation and the laser. Similarly, the up-converted momentum vector will have a direction depending on the direction of the converged incoming radiation photons (which contains image information) and the direction of the laser beam photons (which contains no image information). Hence, laser beam photons whose momentum vectors points in different directions (as they will in a focal point) will distort the image information whereas a perfectly plane wave front will leave the image information undistorted. As also previously mentioned, this is especially relevant in case of spatially incoherent incoming radiation that may not be converged to a tight "focal point" inside the non-linear crystal.

For the purpose of providing the high power of the laser beam inside the non-linear crystal, the arrangement may comprise an optical cavity for providing an increased intra-cavity power of the laser beam. In this embodiment, the non-linear crystal is arranged inside the optical cavity. The optical cavity may comprise two or more mirrors aligned so as to form a standing wave cavity.

In a further preferred embodiment, the laser may comprise a laser medium arranged inside the optical cavity and an extra-cavity pump source for pumping said laser medium. For example, the laser medium may be a laser crystal, a semiconductor, a gas or a liquid, and the pumping source may be an extra-cavity laser such as a semiconductor laser, diode laser, or solid state laser, or a flash lamp, a light emitting diode or current.

When a laser medium is located in the cavity, "spatial hole burning" may occur. Spatial hole burning leads to secondary lasing emission characterized by emitting new wavelengths. Due to a lack of good phase matching of this (or these) new secondary mode(s), the overall efficiency of the SFG is reduced, or leading to different incoming radiation wavelengths are phase matched by the different wavelengths in the cavity. In preferred embodiment, the optical cavity may be a unidirectional ring cavity. In contrast to a standing wave cavity, the unidirectional ring cavity supports a traveling wave which does not lead to standing wave formation and thus spatial hole burning. The unidirectional ring cavity thus provides the advantage of better accommodating an intense laser beam leading to high up-conversion efficiency.

In this embodiment, the optical cavity may comprise a frequency selective element for narrowing the bandwidth of the intra cavity laser beam. This approach also has the purpose of reducing the formation of secondary lasing modes in a standing wave cavity. Typical frequency selective elements are etalons, Lyot filters, gratings and birefringent prisms.

In a further preferred embodiment involving a setup with an intra-cavity laser crystal pumped by an extra-cavity laser as described above, the optical cavity is formed between end facets of the intra-cavity laser crystal and the non-linear crystal, respectively. This has the advantage of allowing for a very compact arrangement which is of interest in many commercial applications. In this embodiment, the various surfaces may be coated to be reflective/transmissive for relevant wavelengths as will be described later.

The arrangement and method described above is capable of enabling imaging, e.g. by utilizing a detector that is sensitive to the up-converted EM radiation in the second wavelength interval. Therefore, in a third aspect, the invention provides use of an arrangement according to the first aspect arranged in front of an image sensor or a light sensitive medium for providing up-converted EMR to the image sensor or medium to shift the effective sensitivity range of the image sensor or medium towards longer wavelengths, such as preferably from the visible spectrum towards the IR spectrum.

BRIEF DESCRIPTION OF THE FIGURES

The aspects of the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
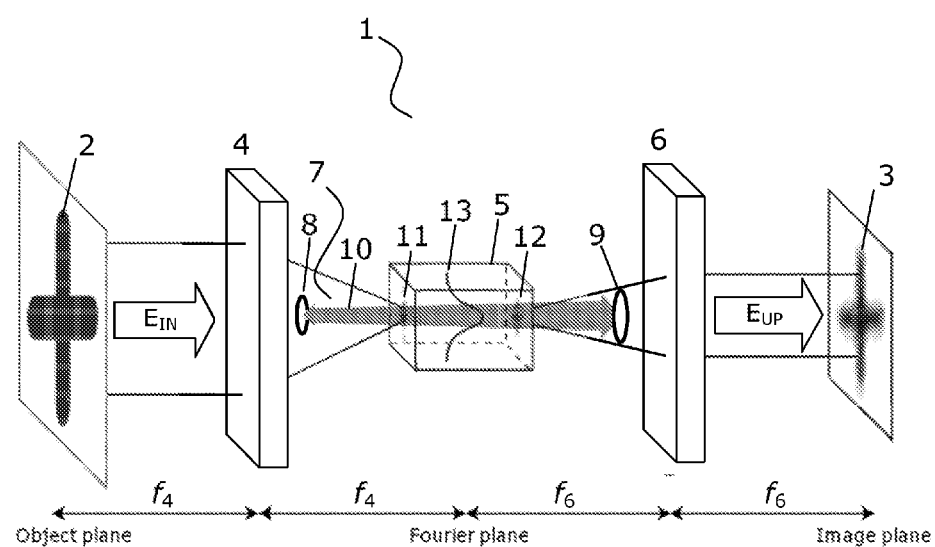
FIG. 1 schematically illustrates an arrangement for up-converting EM radiation.

FIG. 1 schematically illustrates an optical arrangement or system 1 for up-conversion according to an embodiment of the present invention. In order to describe the problem and the solution of the present invention, FIG. 1 and the wording of the present description and claims are also used to describe a prior art arrangement. This should not be used to imply that the problem or the solution of the present invention is in anyway taught or suggested or rendered obvious by in the prior art.

In the arrangement 1, in incoming EM field, $E_{IN}$, wavelength $\lambda_1$, originates from an object plane with a one or two-dimensional object image 2, and the up-converted EM field, $E_{UP}$, is imaged onto an image plane forming an up-converted image 3. Using a first focusing arrangement 4, in the prior art a lens, the incoming EM field is focused inside a non-linear crystal 5, and the up-converted EM field is imaged using a second focusing arrangement 6, in the prior art a lens.

The arrangement also involves a laser (not shown in FIG. 1) for providing an intra-cavity laser beam 10 with electromagnetic field $E_{laser}$ of wavelength $\lambda_2$, inside the non-linear crystal 5.

The non-linear crystal can be arranged in a cavity or resonator 7, formed between mirrors 8 and 9, in order to increase the power of the laser beam 10 inside the non-linear crystal 5. The laser beam 10 can also be focused inside the non-linear crystal 5 using a separate, second focusing arrangement involving focusing optics such as lenses and concave mirrors (not shown in FIG. 1).

According to the Fourier optics theorems, the electric field distribution of the focused incoming EM field in the Fourier plane will be given by a Fourier transform of $E_{IN}$. Thus the fields resulting from the incoming and up-converted EM field at the Fourier plane inside the non-linear crystal 5 are $F(E_{IN})$ and $F(E_{UP})$ respectively, represented by images 11 and 12 in FIG. 1, where F is the Fourier transform with the appropriate wave vector. Similarly, the electric field distribution of the laser beam 10 in the Fourier plane inside the non-linear crystal 5 will be given by $F(E_{laser})$, represented by the Gaussian laser beam profile 13 in FIG. 1. For up-conversion of spatially incoherent radiation, the incoming EM field is not Fourier transformed, but rather transformed to plane waves by the optics. In this case the length requirements between lens and crystal are much more relaxed, since the plane wave exists over an extended distance.

The nonlinear interaction between the two fields $F(E_{IN})$ and $F(E_{laser})$ inside the non-linear crystal can under phase matched condition generate a third field $F(E_{UP})$ based on SFG. According to the energy conservation law, the up converted EM field will have wavelength $\lambda_3$ determined by:

$$\lambda_3 = \left(\frac{1}{\lambda_1} + \frac{1}{\lambda_2}\right)^{-1} \quad (1)$$

where $\lambda_2$ is the wavelength of the laser beam 10 and $\lambda_1$ is the wavelength of the incoming EM field from the object plane.

The up-converted EM field can be expressed as $$E_{UP}(x,y)\left(-x\frac{f_6}{f_4}\frac{\lambda_3}{\lambda_1}, -y\frac{f_6}{f_4}\frac{\lambda_3}{\lambda_1}\right) \propto E_{IN}(x,y), \quad (2)$$

where $f_4$ and $f_6$ are the focal lengths of the applied optical lenses 4 and 6, respectively, and (x,y) are the coordinates in the object plane (relevant when the incoming field produces an image). The factor $-f_6/f_4$ in the up-converted radiation comes from the optical magnification and image inversion by lenses 4 and 6, whereas the factor $\lambda_3/\lambda_1$ is a result of the interaction in the non-linear crystal.

In the application according to the aspects of the present invention, the incoming radiation is polychromatic, and the object image 2 and $E_{IN}$ thereby involves dissimilar first wavelengths, $\lambda_1$, in a wavelength interval, $\Delta\lambda_1$.

Figures 2A, 2B:
FIGS. 2A and B illustrate the blurring of polychromatic images by prior art arrangements for up-conversion.

According to Equation (2), the different wavelengths contained in the incoming EM field will be subject to different magnifications (or rather de-magnifications, since $\lambda_1 > \lambda_3$ for up-conversion). This is a disadvantage of the prior art arrangement for up-converting, as it results in the up-converted image being un-sharp or blurry. In general, different magnifications result in different displacements away from the optical axis in the up-converted image. This means that light with different wavelengths that are magnified differently, are also subject to different displacements even though it originate in the same point in an incoming image. Thereby, the result of the wavelength dependent magnification will be that the sharpness of the up-converted image will decrease (or the blurriness will increase) when moving away from the optical axis. This is simulated in the object and up-converted images shown in FIGS. 2A and B, respectively, here shown in gray tone. One notes that the central part of the image, assumed to lie on the optical axis with coordinates (0,0), is not blurred as this is not or negligibly displaced, whereas the blurriness increases towards the edges.

According to the invention, at least the lens 4, and optionally also the lens 6, are replaced by zone plates. As mentioned previously, zone plates have wavelength dependent focal lengths, and these can be expressed as:

$$f = \frac{k}{\lambda}, \qquad (3)$$

where k is a constant involving the number and widths of the zones. Replacing lens 4 by a zone plate would change the proportionality of equation (2) to $$E_{UP}(x, y)\left(-x\frac{f_6 \lambda_3}{k_4}, -y\frac{f_6 \lambda_3}{k_4}\right) \propto E_{IN}(x, y), \qquad (4)$$

i.e. independent of the wavelength of the incoming radiation, $\lambda_1$. For up-conversion as in the present invention, $\lambda_1 > \lambda_3$ and thereby $\Delta\lambda_1 >> \Delta\lambda_3$ since $$\Delta\lambda_3 \approx \Delta\lambda_1 \left(\frac{\lambda_3}{\lambda_1}\right)^2. \qquad (5)$$

Thus the spread in the up-converted wavelengths are much smaller and thereby the un-sharpness or blurriness in an arrangement where the first focusing arrangement is a zone plate, i.e. where the magnification depends on only the wavelength of the up-converted radiation will be significantly reduced.

It is to be understood that the laser is not focused by the first zone plate. The laser can be focused in the crystal by means of a separate second focusing arrangement for focusing the laser, which does not comprise the first zone plate.

By also replacing lens 6 with a zone plate would lead to the magnification being independent of both $\lambda_1$ and $\lambda_3$, and an up-converted image undistorted by the wavelength dependent magnification introduced by the SFG.

FIG. 1 as described above where focusing arrangement 4, and optionally also focusing arrangement 6, are zone plates thus represents one embodiment of the invention.

Figure 3A:
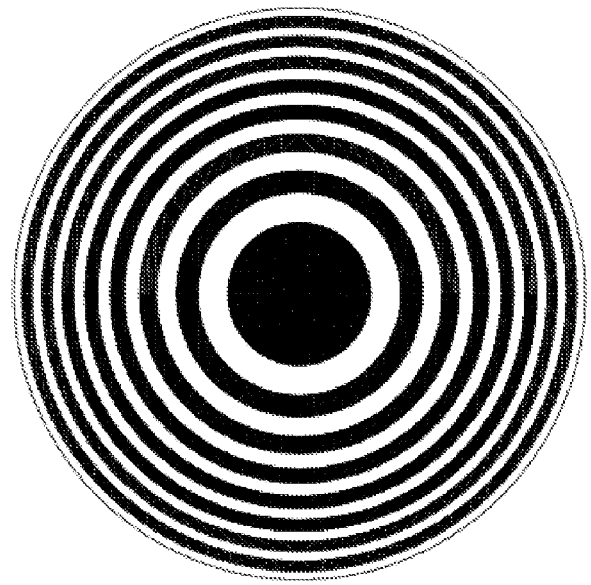
FIGS. 3A and 3B show different Fresnel zone plates in different views.
Figure 3B:

FIGS. 3A and 3B illustrate different zone plates. Zone plates are traditionally applied to focus ultraviolet EM radiation, where the refractive index in refractive materials used for standard optical components (typically glasses, plastics) is so close to 1 that the effective refraction is too small.

FIG. 3A is a front view illustrating a binary zone plate, i.e. a zone plate with two levels (M=2), typically 0/π phase shift or transparent/non-transparent, here with 16 zones (n=16). FIG. 3B is a side view illustrating a multi-level zone plate, here a three-level zone plate (M=3) with 15 zones (n=15). The side view illustrates material thickness so that light transmitted or reflected by the various levels experience relative phase shifts.

As mentioned previously, it is preferred that the zone plate has a phase distribution function equivalent to a spherical convex lens. The degree of equivalence is proportional to the number (n) of zones, and zone plates with only few zones (such as less than 8) provide only crude approximations. In a preferred embodiment, the zone plate has at least 8 zones (n>8), such as at least 10, 15, 20, or 25 zones, or preferably at least 30 zones, in order to provide an applicable focusing of the incoming image to a plane or approximately plane and thereby a good conversion of the entire image. The zone plate should have enough levels (M≥2), and will have a size of at least $r_n$ where n≥4M. Theoretically, the more levels (higher M), the more effective and precise the focusing of the zone plate. In preferred embodiments, the zone plate involves at least 2, such as at least 4, 6, or 8 levels.

The more zone-pairs, (2 n/M), the larger the zone plate will be and the larger images can be focused and thereby converted. In addition, the zone plate should preferably at least have a size that matches the maximum angle that can be converted in the nonlinear crystal. The size of the image is limited by a number of parameters such as the dimensions, refractive index, and angular acceptance parameters of the non-linear crystal.

Zone plates can be based on liquid crystal displays where different orientation of the liquid crystal may produce different refractive indices or opacities. This allows changing the configuration of the zone plate electronically by use of e.g. a computer.

Figure 4:
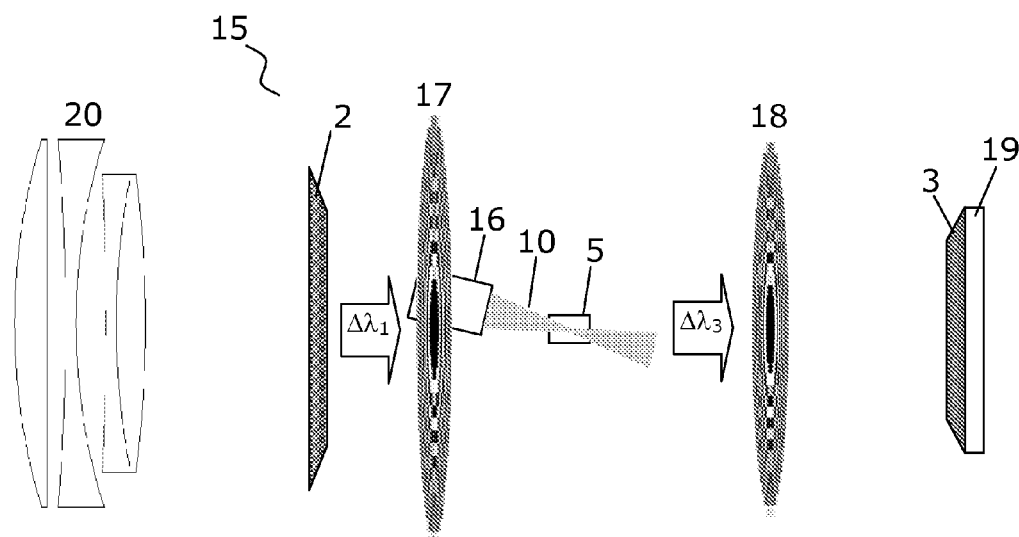
FIG. 4 schematically illustrates an arrangement according to a preferred embodiment of the invention.

A preferred arrangement and method is described below with references to FIG. 4. Here, an arrangement 15 comprises laser beam 10 provided by laser 16 and being collimated inside non-linear crystal 5. Incoming polychromatic radiation in interval $\Delta\lambda_1$ from an object image 2 is converged inside the non-linear crystal by first zone plate 17, and up-converted polychromatic radiation in interval $\Delta\lambda_3$ is produced.

In further preferred embodiments, the arrangement 15 can comprise a second zone plate 18 for forming an up-converted image 3 from the up-converted radiation. The arrangement can also comprise an image sensor 19 on which the up-converted image 3 is formed. The image sensor may be a CMOS or CCD sensor that can record images electronically. The arrangement can further comprise an image forming lens arrangement 20, such as a Tessar lens design or similar, for forming the object image 2 from an object, scenario or situation.

Figure 5:
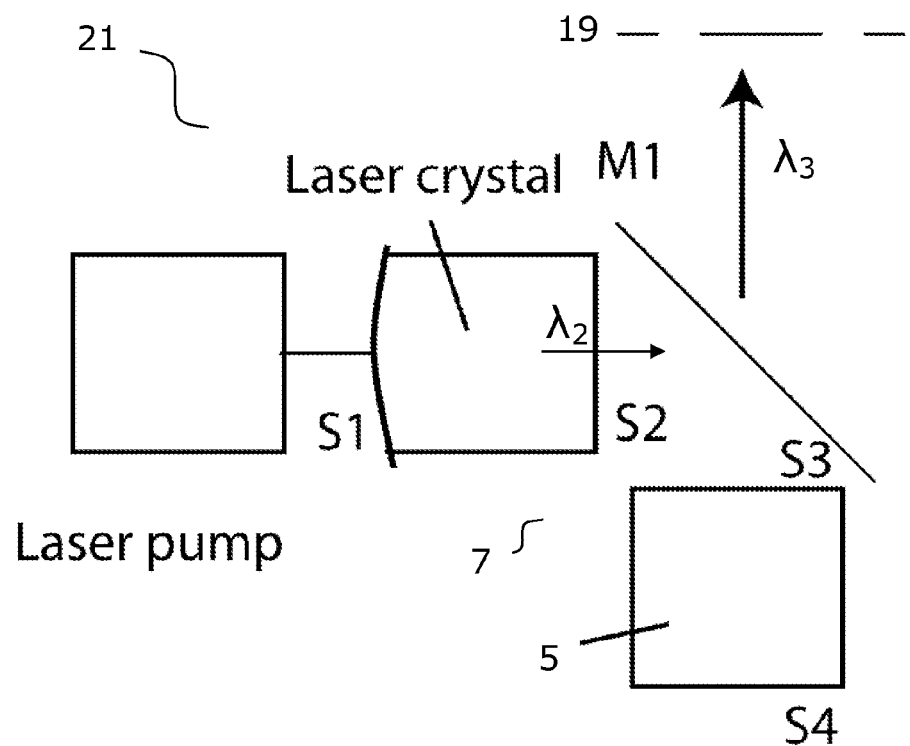
FIG. 5 schematically illustrates another arrangement according to an embodiment of the invention.

The arrangement can be made very compact to be integrated in e.g. commercial cameras and microscopes. Such a compact arrangement 21 is described below with reference to FIG. 5.

The incoming radiation ($\lambda_1$) is converged by the first zone plate 18 into the nonlinear crystal 5. In the non-linear crystal the radiation is up-converted to $\lambda_3$ and transmitted through the mirror M1 for subsequent application such as focusing and detection. The focusing of the up-converted radiation $\lambda_3$ can be with a second zone plate 19 or a regular lens system.

The laser involves a laser crystal arranged inside an optical cavity 7 and a laser pump outside the optical cavity. The optical cavity 7 is established between of surfaces S1 and S4 which are coated for high reflection at the wavelength of the laser beam, $\lambda_2$. Similarly, surfaces S2 and S3 can be coated for high transmission of $\lambda_2$. The surface S1 can be coated for high transmission of a wavelength of the laser pump. The surface S3 can be coated for high transmission of the up-converted $\lambda_3$, and S4 can be coated for high transmission of $\lambda_1$. Further, the mirror M1 can be coated for high reflection of $\lambda_2$ and for high transmission of $\lambda_3$. The surface S1 can be non-flat (concave or convex) in order to get optimal size of a beam waist of the laser beam, and is an embodiment of the separate, second focusing arrangement for focusing the laser.

Figure 6A:
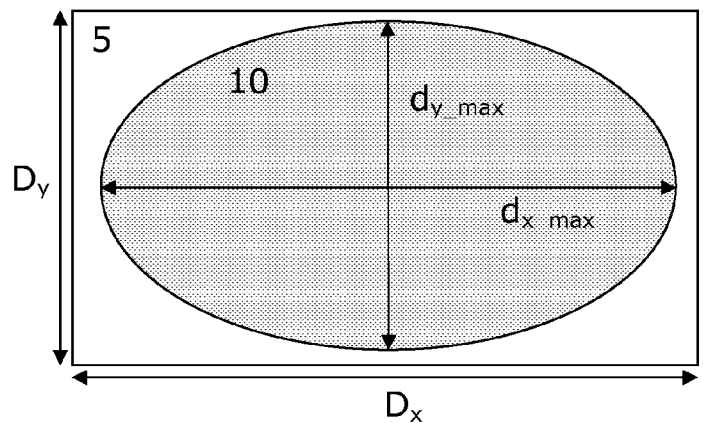
FIGS. 6A and B illustrate preferred relations of laser beam diameters and between diameters of the laser beam and the non-linear crystal.
Figure 6B:
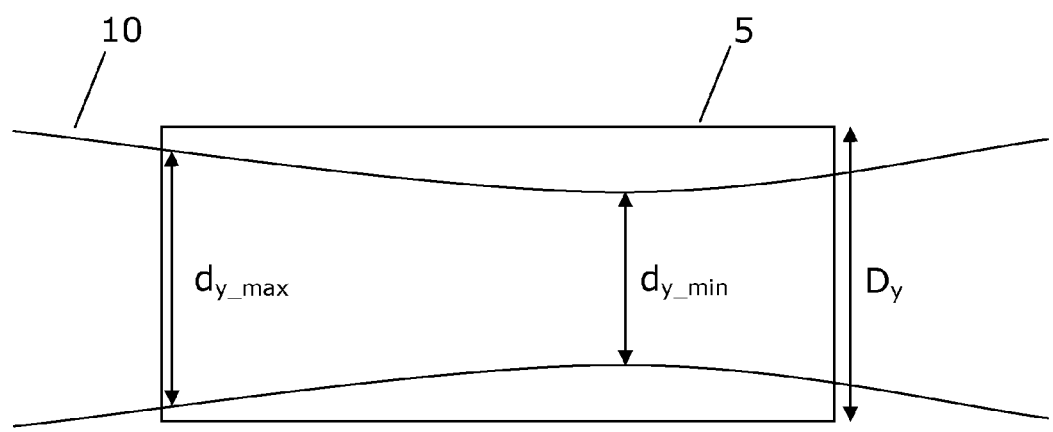

FIGS. 6A and B illustrates embodiments of the invention relating to the laser beam inside the non-linear crystal. As described previously, it is of interest that the laser beam wave front inside the non-linear is as plane as possible for a given arrangement. To optimize this parameter, the laser beam 10 can be kept large in relation to the size of the non-linear crystal 5, which can be quantified by the beam size at entry/exit in relation to the beam waist or in relation to the transverse dimensions of the crystal. The crystal's (optical) width and height in directions transverse to the propagation of the laser beam are denoted $D_x$ and $D_y$, respectively. The corresponding largest diameters of the laser beam during its propagation through the non-linear crystal are denoted $d_{x\_max}$ and $d_{y\_max}$, respectively; these are typically the laser beam diameters at the front and/or back facet of the non-linear crystal. These are all illustrated in FIG. 6A. Similarly, the smallest diameters of the laser beam during its propagation through the non-linear crystal are denoted $d_{x\_min}$ and $d_{y\_min}$, respectively; these are typically the diameters at the laser beam waist (or focus) inside the non-linear crystal. $d_{y\_min}$ is illustrated together with $d_{y\_max}$ and $D_y$ in FIG. 6B.

When configuring or designing the arrangement, the size of the laser beam inside the non-linear crystal can be chosen to fulfill one or more of the following optimization criteria:

$d_{x\_max} > 0.95 D_x$, such as $> 0.9 D_x$ or $> 0.8 D_x$.
$d_{y\_max} > 0.95 D_y$, such as $> 0.9 D_y$ or $> 0.8 D_y$.
$d_{x\_min} > 0.9 D_x$, such as $> 0.7 D_x$ or $> 0.5 D_x$.
$d_{y\_min} > 0.9 D_y$, such as $> 0.7 D_y$ or $> 0.5 D_y$.
$d_{x\_min}/d_{x\_max} > 0.98$, such as $> 0.95$, $> 0.9$ or $> 0.8$
$d_{y\_min}/d_{y\_max} > 0.98$, such as $> 0.95$, $> 0.9$ or $> 0.8$.

In general, the more of these optimization criteria are fulfilled and the larger the different diameters of the laser beam are under each criteria, the less the distortion of the resolution of the up-converted image.

The degree to which a design can be made optimal depends on many other factors, such as restrictions on the size of the arrangement and the applied laser. In applications where a high conversion efficiency is desirable, a long crystal thin crystal can be used although the obtainable resolution is lower for longer and thinner crystals. Shorter crystals allow for transmission of larger angles of incident light which implies larger images. If conversion efficiency is not critical a shorter crystal can be used. The crystal height for periodically poled crystals is limited, whereas crystal length and width can be chosen more freely. This can result in a crystal with wide yet not so high dimensions yielding different resolutions in the two dimensions, if a non-symmetrical laser beam is used (as in FIG. 6A). For applications where an un-poled crystal can be used it may be desirable to use a much higher and perhaps shorter crystal supporting a large dimensioned laser beam to maximize the attainable resolution. One can show that the obtainable resolution is proportional with the beam waist size. Therefore the preferred configuration is to have as large as possible beam waist while not getting too much cropping of the laser by the edges of the crystal.

Depending on the transverse shape of the laser beam, the diameters may be defined in different ways. In the case of a Gaussian beam, it is customary to define the beam diameter as the width where the intensity drops to $1/e^2$ (~13.5%) of the maximum value. For other beam profiles, similarly definitions of the diameter can be applied as will be recognized by the person skilled in the art.

The published patent application WO 2010/006985 from the same applicant has detailed descriptions of a number of components, elements or method steps that can be also be applied in the arrangement or method of the present invention. Hence, reference is made thereto for details regarding e.g. the cavity, the laser and the generation of the laser beam, the non-linear crystal for SFG, details related to set-up and tuning of the components used in SFG, etc. WO 2010/006985 is included in the present description by reference.

The non-linear crystal can for example be a Brewster's cut non-linear crystal, e.g. a periodically poled (PP) $KTiOPO_4$, $LiNbO_3$, or PP-$LiOTiO_3$ crystal. These are described in more detail in WO 2010/006985. The non-linear crystal can further be temperature controlled using a Peltier element or an oven.

As the person skilled in the art will realize, numerous optical cavity layouts are possible depending on e.g. the intended use, the laser, and the size and specifications of the other components.

Also, the number of different type of lasers available on the marked is ever-growing. If no optical cavity is used, the laser can be a high power laser, such as diode lasers, $CO_2$ lasers, solid state lasers, fiber lasers, disc lasers etc. High power lasers are expected to increase in efficiency and fall in price over the coming years. Also, new high power laser types may be developed.

The laser may be a continuous wave (CW) laser or a pulsed laser. If a pulsed laser is used, the up-converted radiation will be produced in pulses as well, and this may be applicable in many applications. Pulsed lasers can generally be used to provide higher power as the energy is delivered in short bursts (and power is energy/time).

Several different applicable high power lasers are described in more detail in WO 2010/006985.

Typical applications of incoherent incoming radiation are for imaging of thermal radiation such as in thermal cameras, scientific IR cameras or night vision cameras or binoculars, telescopes, microscopes, spectrographs, or spatial light sensors in general. Typical applications for coherent incoming radiation are for holography, speckle interferometry or confocal microscopy.

The invention is particularly suitable for imaging of thermal radiation in relation to longer distances due to the small effective aperture and thereby long depth of field.

In a preferred embodiment, the invention provides a device for imaging thermal radiation comprising an arrangement for up-converting incoming polychromatic EMR according to the first aspect. In another embodiment, the invention provides a thermal sight, such as a binoculars or a telescope, comprising an arrangement for up-converting incoming polychromatic EMR according to the first aspect.

In an additional aspect, the invention provides the use of an arrangement or a method according to the invention or an embodiment thereof for thermal tracking, such as tracking of air planes in airports or missile target tracking.

Although the present invention has been described in connection with the specified embodiments, it should not be construed as being in any way limited to the presented examples. The scope of the present invention is set out by the accompanying claim set. In the present description, the terms configured to and configured for means set up and/or selected for a particular purpose. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCES

WO 2010/006985
EP 0 725 307

The invention claimed is:

1. An arrangement for up-converting incoming polychromatic electromagnetic radiation (EMR) in wavelength interval $\Delta\lambda_1$ into up-converted EMR in corresponding wavelength interval $\Delta\lambda_3$ of smaller wavelengths than the wavelength interval $\Delta\lambda_1$, the arrangement comprising:
a nonlinear crystal;
a laser for providing a laser beam having a second wavelength, $\lambda_2$, different from the first wavelengths; and
a first zone plate for converging the incoming EMR inside the nonlinear crystal;
wherein the nonlinear crystal is selected for producing up-converted EMR by sum frequency generation between the incoming EMR and the laser beam; and
wherein the nonlinear crystal, the laser, and the first zone plate are arranged so that:
the laser beam will be provided in the nonlinear crystal;
the incoming EMR will be converged in the nonlinear crystal by the first zone plate and in spatial overlap with the laser beam; and
the laser beam will not be converged in the nonlinear crystal by the first zone plate.

2. The arrangement according to claim 1, wherein the arrangement comprises an optical cavity for providing an increased intra-cavity power of the laser beam, and wherein the non-linear crystal is arranged inside the optical cavity.

3. The arrangement according to claim 1, wherein the first zone plate has a phase distribution function equivalent to a spherical convex lens.

4. The arrangement according to claim 1, wherein the first zone plate has at least 8 zones.

5. The arrangement according to claim 1, further comprising a second zone plate for receiving and collimating up-converted EMR from the non-linear crystal.

6. The arrangement according to claim 1, wherein the arrangement comprises imaging optics arranged before the first zone plate for producing a two-dimensional image from the incoming EMR.

7. A method of using the arrangement according to claim 1 to shift the effective sensitivity range of an image sensor towards longer wavelengths comprising:
positioning the arrangement of claim 1 in front of an image sensor; and
providing up-converted EMR to the image sensor so as to shift the effective sensitivity range of the image sensor towards longer wavelengths.

8. A method for up-converting incoming polychromatic electromagnetic radiation (EMR) into up-converted EMR with wavelength smaller than the incoming EMR, the method comprising:
converging incoming polychromatic EMR in a nonlinear crystal by means of a first zone plate;
providing a laser beam of a second wavelength, $\lambda_2$, in the nonlinear crystal, where the first zone plate is arranged so that the laser beam is not converged in the nonlinear crystal by the first zone plate; and
producing up-converted EMR by sum frequency generation between the incoming EMR and the laser beam in a spatial overlap between the incoming EMR and the laser beam inside the non-linear crystal.

9. The method according to claim 8, wherein the first zone plate has a phase distribution function equivalent to a spherical convex lens.

10. The method according to claim 9, further comprising producing a two-dimensional image from the incoming EMR on the first zone plate.

11. The method according to claim 9, further comprising collimating the produced up-converted EMR by means of a second zone plate.

12. The method according to claim 8, wherein at least some of the incoming polychromatic EMR has a wavelength longer than 750 nm.

13. The method according to claim 8, wherein the incoming polychromatic EMR comprises incoherent radiation.

14. The method according to claim 8, wherein the incoming polychromatic EMR contains image information.

15. The method of claim 8, wherein the incoming polychromatic EMR comprises coherent radiation or a combination of coherent and incoherent radiation.

* * * * *